United States Patent [19]

Tanaka et al.

[11] Patent Number: 4,809,100
[45] Date of Patent: Feb. 28, 1989

[54] APPARATUS HAVING CASSETTE LOADING AND UNLOADING FUNCTIONS AND AN OPERATION MODE SELECTING FUNCTION

[75] Inventors: Nobuyuki Tanaka; Kazunori Akita, both of Nagoakakyo, Japan

[73] Assignee: Mitsubishi Denki Kabushiki Kaisha, Tokyo, Japan

[21] Appl. No.: 870,409

[22] Filed: Jun. 4, 1986

[30] Foreign Application Priority Data

Jun. 4, 1985 [JP] Japan .................. 60-122922

[51] Int. Cl.$^4$ ............................................. G11B 15/00
[52] U.S. Cl. ........................... 360/96.1; 360/93; 360/74.1
[58] Field of Search ............... 360/105, 88, 90, 93, 360/96.1, 96.5, 70, 71, 74.1

[56] References Cited

U.S. PATENT DOCUMENTS

| | | | |
|---|---|---|---|
| 4,219,852 | 8/1980 | Magata et al. | 360/105 |
| 4,626,937 | 12/1986 | Hutterer et al. | 360/74.1 |
| 4,652,947 | 3/1987 | Oka et al. | 360/93 |

FOREIGN PATENT DOCUMENTS

| | | |
|---|---|---|
| 2917716 | 11/1979 | Fed. Rep. of Germany . |
| 3014073 | 10/1980 | Fed. Rep. of Germany . |
| 3308110 | 9/1983 | Fed. Rep. of Germany . |
| 3322638 | 12/1983 | Fed. Rep. of Germany . |
| 3404099 | 8/1984 | Fed. Rep. of Germany . |
| 0024059 | 2/1982 | Japan .................. 360/74.1 |
| 0141046 | 9/1982 | Japan .................. 360/74.1 |

Primary Examiner—Robert S. Tupper
Assistant Examiner—Andrew L. Sniezek
Attorney, Agent, or Firm—Lowe, Price, LeBlanc, Becker & Shur

[57] ABSTRACT

An apparatus having functions of loading and unloading a cassette and a function of selecting an operation mode comprises an epicyclic gear as a speed reducer from which two outputs are obtained. A first cam for loading and unloading a cassette is rotated by one of the outputs and a second cam for selecting an operation mode is rotated by the other output. The apparatus also includes a lock mechanism for selectively stopping of the first cam or the rotation the second cam.

2 Claims, 11 Drawing Sheets

APPARATUS HAVING CASSETTE LOADING AND UNLOADING FUNCTIONS AND AN OPERATION MODE SELECTING FUNCTION

BACKGROUND OF THE INVENTION

1. Field of the Invention

The present invention relates to an apparatus having cassette loading and unloading functions and an operation mode selecting function, suitable for use in a cassette tape recorder, a video tape recorder, a digital audio tape recorder or the like.

2. Description of the Prior Art

In a cassette tape recorder, for example, a cassette loading and unloading mechanism and an operation mode selecting mechanism are conventionally provided independently of each other.

FIG. 14 is a view showing an example of a conventional cassette loading and unloading mechanism in a cassette tape recorder. Referring to FIG. 14, a conventional cassette loading and unloading mechanism will now be described.

In FIG. 14, a cassette loading and unloading cam has a cam groove 2 formed on the major surface thereof. A cylindrical portion 3 is provided around the central axis of cam 1 and a cam groove, not shown, is formed on this cylindrical portion 3. The outer circumference of the cassette loading and unloading cam 1 is coupled to a driving source 4 such as a motor so that the cassette loading and unloading cam 1 is rotated by the driving source 4.

The cam groove 2 is engaged with one end of a first oscillation link 5 having an almost L-shaped form and the other end of the link 5 is engaged with a slider pack 6 to form a sliding and turning pair. When the cassette loading and unloading cam 1 is rotated, the first oscillation link 5 moves so that the slider pack 6 slides in the vertical direction in FIG. 14. Thus, the sliding of the slider pack 6 controls the position of an inserted cassette tape in the horizontal direction (which corresponds to the vertical direction in FIG. 14).

The cam groove formed on the cylindrical portion 3 of the cam is engaged with a working end of a second oscillation link 8. The second oscillation link 8 has a relatively large surface portion and one side thereof (the lower side in FIG. 14) is engaged with a cassette holder 9 to form a turning pair. The upper right and left sides (in the drawing) of the second oscillation link 8 are rotatably supported by a base arm 10 which is partially shown. In response to the rotation of the cassette loading and unloading cam 1, the second oscillation link 8 oscillates around the portion supported by the base arm 10 so that the cassette holder 9 engaged to this turning pair is moved vertically (in the direction perpendicular to the surface of the drawing). This movement of the cassette holder 9 controls the vertical position of the cassette tape 7.

FIG. 15 is a view showing an example of a conventional operation mode selecting mechanism provided in a cassette tape recorder.

Referring to FIG. 15, the operation mode selecting mechanism comprises a driving source 11, an operation mode selecting cam 12, an oscillation link 13 and a mode plate 14. The operation mode selecting cam 12 has a major surface on which a circular cam groove 15 is formed in a manner eccentric with respect to the central axis of the cam 12. This cam groove is engaged with one end of the oscillation link 13 and the other end of the oscillation link 13 is engaged with the mode plate 14 to form a sliding pair. Thus, when the operation mode selecting cam 12 is rotated by the driving source 11, the oscillation link 13 moves with a supporting point 16 as the center so that the mode plate 14 slides vertically in FIG. 15. The mode plate 14 is moved by the oscillation link 13 so that the stopped position thereof controls the positions of a pinch roller, an idler for reel rest and the like, to select a necessary operation mode.

Conventional cassette loading and unloading mechanisms and a conventional operation mode selecting mechanisms structured respectively as described above, are of various types such as the type comprising motors 4 and 11 specially provided as the driving sources or the type using driving sources 4 and 11 from a main motor for running a cassette tape. However, in any type, a cassette loading and unloading mechanism and an operation mode selecting mechanism are structured independently. Although the above described mechanisms are shown as the mechanism in which the driving source 4 drives directly the cassette loading and unloading cam 1 or the mechanism in which the driving source 11 drives directly the operation mode selecting cam 12, the driving sources 4 and 11 in reality each includes a special motor or a main motor so that the cams 1 and 2 are rotated or moved through a complicated reduction unit or the like for decreasing the rotating force of the motor and amplifying the rotating force to a predetermined value. Accordingly, a real structure for those machanisms requires large areas for the driving sources 4 and 11 and the cams 1 and 12, and a large number of components are contained in this structure.

The below indicated table shows the driving sources for a cassette loading and unloading mechanism and an operation mode selecting mechanism in a conventional cassette tape recorder as well as the control method for those driving sources. From this table, a technical trend in the prior art concerning a cassette loading and unloading mechanism and an operation mode selecting mechanism in a cassette tape recorder or a video tape recorder can be seen.

TABLE 1

| Function | Driving Source | Control Method |
| --- | --- | --- |
| Cassette loading and unloading | Main motor (use with flywheel) | On-off control by operation of plunger (+ turning on and off of power source) On-off control according to the rotating direction of motor (+ turning on and off of power source) |
| Operation mode | Special motor | Turning on and off of power supply |

TABLE 1-continued

| Function | Driving Source | Control Method |
| --- | --- | --- |
| selection | Main motor (used with flywheel) | Notched gear + plunger<br>Pressed gear + plunger |
| | Constant rotation in operation | Mode selection according to the rotating direction of motor |
| | Large-sized suction plunger | Turning on and off of power source |
| | Special motor | Turning on and off of power source<br>Mode selection according to the rotating direction of motor |

As shown in the Table 1, a conventional cassette loading and unloading mechanism and a conventional operation mode selecting mechanism each have a structure in which a main motor is used as a driving source, or a structure in which a special motor is used as a driving source. The structure using a main motor as a driving source requires a plunger corresponding to a cassette loading and unloading mechanism and a reduction unit or the like for obtaining necessary operation force. It also requires a plunger corresponding to an operation mode selecting mechanism and a reduction unit or the like for obtaining necessary operation force. As a result, in a cassette tape recorder for example, units for the above described machanisms not associated with the running of a cassette tape need to be rotated all the time during the running of the cassette tape (in the play state) in most cases, which has the disadvantage that the running of the tape or other operation becomes unstable. In addition since, in many cases, the plunger is driven according to the two states, namely ON and OFF states of a solenoid so as to select a necessary mode, as many as three or four solenoids are required in a complicated mechanisms. In a cassette tape recorder having an automatic reversing function, for example, this causes an increase in the manufacturing cost and the size of the apparatus.

On the other hand, the structure using a special motor as a driving source requires a special motor and a special reduction unit. Accordingly, this structure has the disadvantage that the mechanism as a whole becomes large-sized and the manufacturing cost thereof is increased.

In addition, a design using a main motor for either of the mechanisms and using a special motor for the other mechanism may be considered. Even in such design, a reduction unit for obtaining necessary force is required for each mechanism and the above described problems such as a large size and an increase in the number of components cannot be avoided.

SUMMARY OF THE INVENTION

Therefore, a principal object of the present invention is to provide an apparatus having cassette loading and unloading functions and an operation mode selecting function, in which a reduction unit and other components are used in common for a cassette loading and unloading mechanism and an operation mode selecting mechanism so that the size of the apparatus and the number of components therein can be decreased.

Briefly stated, the present invention comprises: an epicyclic gear as a reduction unit; a first cam for cassette loading and unloading, which is rotated by one of two outputs obtained from the epicyclic gear; a second cam for operation mode selection, which is rotated by the other output of the epicyclic gear; and a lock mechanism for stopping selectively the rotation of the first cam or the second cam.

The rotating speed of the drive motor is considerably decreased by the epicyclic gear, so that the first cam and the second cam are rotated at predetermined slower rates respectively. The rotation of the first cam drives a mechanism for horizontally introducing and ejecting a cassette, a mechanism for moving the cassette vertically and a mechanism for moving a head base backward. The rotation of the second cam drives a mechanism for selecting an operation mode. The operation of the mechanisms driven by the first cam and the operation of the mechanism driven by the second cam are selectively stopped by the lock mechanism so that the mechanisms driven by the first cam and the mechanism driven by the second cam may not operate simultaneously.

According to the present invention, a motor and a reduction unit are used in common so that a plurality of mechanisms are operated. As a result, an apparatus having cassette loading and unloading functions and an operation mode selecting function can be made small-sized and can be made to have a relatively small number of components.

Furthermore, if an apparatus of the present invention is incorporated in a cassette tape recorder or the like, the cassette tape recorder can be made small-sized as a whole since the space occupied by this apparatus is small, and accordingly, a relatively light load is applied to the main motor for running the cassette tape.

These objects and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described, as it would be used, for example in a cassette tape recorder having an automatically reversing function. It is to be noted however that the present invention is applicable not only to a cassette tape recorder but also to a video tape recorder, a digital audio tape recorder and the like.

Figure 1:
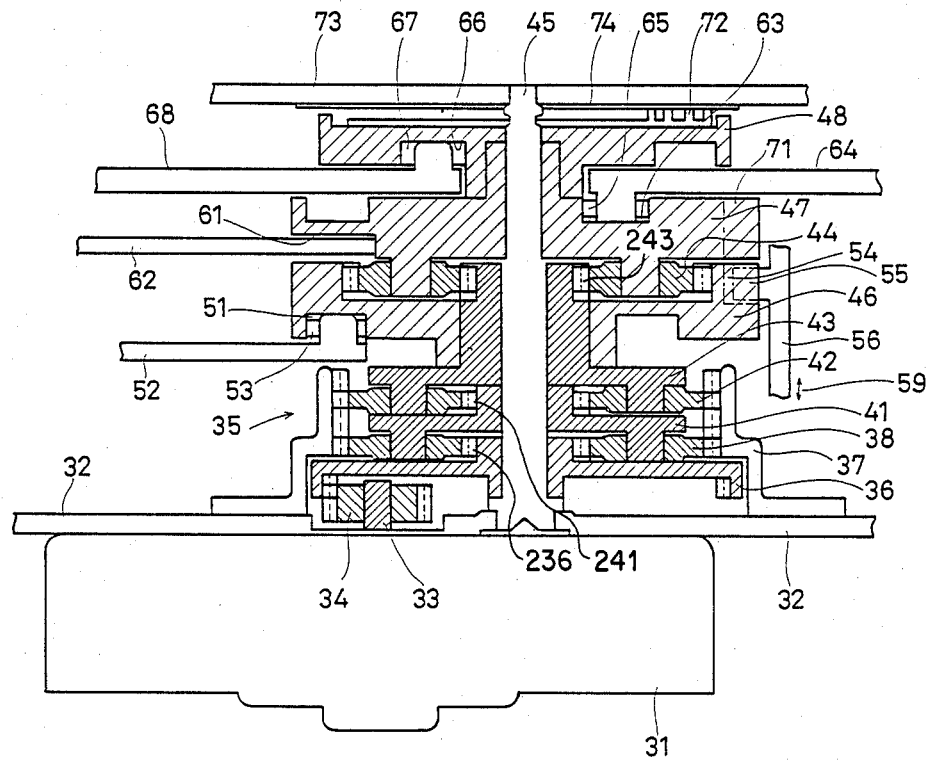
FIG. 1 is a side sectional view showing a structure of a reduction unit in accordance with an embodiment of the present invention.

FIG. 1 is a side sectional view for explaining a structure of the reduction unit and a relationship between the reduction unit and various cams. The reduction unit comprises an epicyclic gear 35.

Referring to FIG. 1, a power motor 31 is fixed to a main base 32 of a cassette tape recorder. The power motor 31 is a thin flat motor which has a rotating shaft 33 projecting upward from the main base 32, a pinion gear 34 being fixed to the rotating shaft 33. The pinion gear 34 is engaged with the epicyclic gear 35 so as to drive the epicyclic gear 35.

The epicyclic gear train 35 comprises an internal rotatable gear 36, a fixed internal gear 37, first planetary wheels 38, a first carrier 41, second planetary wheels 42, a second carrier 43 and third planetary wheels 44. The internal rotatable gear 36, the first carrier 41 and the second carrier 43 are placed one upon another and a cam post 45 fixed to the main base 32 is inserted therethrough so that they can rotate respectively around this cam post 45 with the cam post axis as the center of rotation for each. The fixed internal gear 37 is fixed to the main base 32. The internal rotatable gear 36 is engaged with the pinion gear 34 and the first planetary wheels 38 so that it is driven by the pinion gear 34 to rotate around the cam post 45, with the axis thereof as the center of rotation. The rotating force of the internal gear 36 is transmitted to the first planetary wheels 38.

The first planetary wheels 38 are supported rotatably by the first carrier 41 and they are engaged with the internal gear 36 and the fixed internal gear 37 so as to rotate. Thus, the torque from internal gear 36 is transmitted via gear 236 through the first planetary wheels 38 thereby to the first carrier 41.

The gear 241 formed on the first carrier 41 is engaged with the second planetary wheels 42. The second planetary wheels 42 are supported rotatably by the second carrier 43 and they are engaged with the first carrier 41 at gear 241 and also to the fixed internal gear 37 so as to rotate. Thus, the torque from the first carrier 41 is transmitted via gear 241 through the second planetary wheels 42 and thereby to the second carrier 43. Further, the gear 243 formed on the second carrier 43 is engaged with the third planetary wheels 44. By means of the third planetary wheels 44, a mode selection cam 46 is driven at a speed decreased to a prescribed value, and a cam 47 for horizontal movement of cassette and backward movement of head base and a cam 48 for vertical movement of cassette are driven at a speed decreased to another prescribed value.

The operation mode selection cam 46 is engaged rotatably with the second carrier 43 and it rotates around the second, carrier 43, namely, with the axis of cam post 45 as a center of rotation. A cam groove 51 having a prescribed loop form (an endless form), to be described later, is formed on the lower surface of the operation mode selection mode cam 46. The cam groove 51 is engaged with an oscillation link 52. Accordingly, the oscillation link 52 is driven by the rotation of the operation mode selection cam 46. Rollers 53 are interposed between the cam groove 51 and the oscillation link 52 so that friction force therebetween can be decreased and movement can be transmitted smoothly.

A stopper cavity 54 is formed in a portion of the outer circumferential surface cf the operation mode selection cam 46. A lock pin 55 can be fitted into this stopper cavity 54.

The cam 47, for horizontal movement of the cassette and backward movement of the head base, which comprises support shafts for the third planetary wheels 44 is rotated around the axis of cam post 45 as the center by a rotation of the third planetary wheels 44. A notch 61 is formed in a lower portion of the outer circumferential surface of the cam 47 and a link 62 for backward movement of head base is engaged with this notch 61. Thus, the rotation of the cam 47 of horizontal movement of cassette and backward movement of head base enables the link 62 for backward movement of head base to be selectively in contact with the notch 61 or the outer circumferential surface of the cam 47 so that the link 62 for backward movement of head base oscillates.

A cam groove 63 is formed on the upper surface of the cam 47 for horizontal movement of cassette and backward movement of head base. The cam groove 63 is an endless groove having a predetermined loop shape which is described hereinafter. This cam groove 63 is engaged with one end of an oscillation link 64 for horizontal movement of the cassette. Thus, by the rotation of the cam 47 for horizontal movement of the cassette and backward movement of the head base, the oscillation link 64 for horizontal movement of the cassette effects a prescribed oscillating operation. Rollers 65 are interposed between the cam groove 63 and the horizontal oscillation link 64 so that friction therebetween can be prevented and engaging contact therebetween can be made smoothly.

A cam 48 for vertical movement of the cassette is fixed to the cam 47 for horizontal movement of cassette and backward movement of head base. Thus, according to the rotation of the cam 47, the vertical movement cam 48 also rotates around the axis of cam post 45 as the center of rotation. A cam groove 66 is formed on the lower surface of the vertical movement cam 48. The cam groove 66 is engaged with one end of an oscillation link 68 for vertical movement of the cassette through rollers 67.

Although this embodiment has a structure in which the cam 47 for horizontal movement of the cassette and backward movement of the head base and the cam 48 for vertical movement of the cassette are formed and fixed separately, the cam 47 and the cam 48 may be formed integrally as a unitary body.

A notch 71 is formed in a portion of the outer circumferential surface of the cam 47 for horizontal movement of the cassette and backward movement of the head base. A lock pin 55 can be fitted into this notch 71.

The lock pin 55 is a projecting portion formed on a lock plate 56, as best seen in FIG. 1. The lock plate 56 can move vertically as shown by the arrow 59 in the drawing. When the lock plate 56 moves downward as shown in the drawing, the lock pin 55 is engaged with the stopper cavity 54 of the operation mode selection cam 46 to stop the rotation of the operation mode selection cam 46. When the lock plate 56 moves upward, the lock pin 55 is engaged with the notch 71 of the horizontal and backward movement cam 47 to stop the rotation of the cam 47 and the rotation of the cam 48 for vertical movement of cassette. Thus, by the movement of the lock plate 56, the lock pin 55 stops either the rotation of the operation mode selection cam 46 or the rotation of the horizontal and backward movement cam 47 (and the vertical movement cam 48), so that the operation mode is fixed to a prescribed mode at the time of loading and unloading the cassette tape, or the cassette tape is prevented from being loaded or unloaded during the operation (running) of the cassette tape.

A mode switching brush 72 provided on the upper surface of the vertical movement cam 48 is formed to be in contact with a mode switching circuit 74 provided on the lower surface of an upper base 73, so that the rotating angle of the cam 48 (and the cam 47), that is, the present position for driving the cassette can be detected by the position of contact between the mode switching brush 72 and the mode switching circuit 74.

Figure 2:
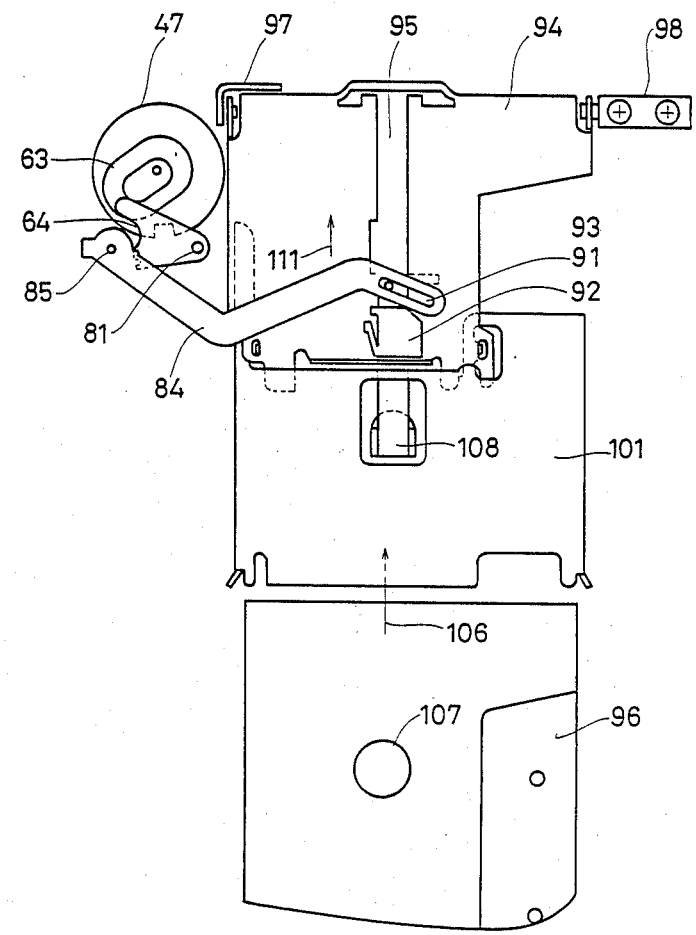
FIG. 2 is a plan view showing a mechanism for horizontally introducing and ejecting a cassette tape in an embodiment of the present invention.
Figure 3:
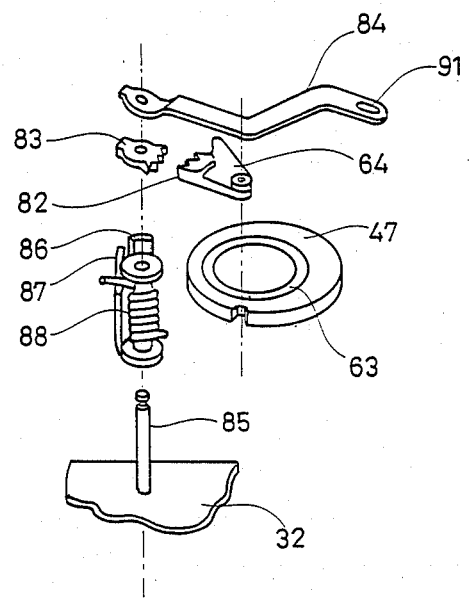
FIG. 3 is an exploded perspective view for explaining a relation of coupling between a cam and a link mechanism.

FIGS. 2 and 3 will now be described. FIGS. 2 and 3 are views for explaining a link mechanism driven by the cam 47 for horizontal movement of cassette and backward movement of head base shown in FIG. 1.

FIG. 2 is a plan view showing a mechanism for horizontally introducing and ejecting a tape cassette. FIG. 3 is an exploded perspective view for explaining a relation of coupling between the cam 47 and the link mechanism shown in FIG. 2. First referring to FIGS. 2 and 3, the mechanism for horizontally introducing and ejecting a tape cassette will be described.

As described in connection with FIG. 1, the cam groove 63 for horizontal oscillation of the cassette is formed on the upper surface of the horizontal and backward movement cam 47. In plan figure view, the horizontal oscillation link 64 is nearly V-shaped, or sector-shaped and the top portion of the link 64 is supported rotatably by a post 81 projecting from the main base 32. One end of the horizontal oscillation link 64 is engaged with the cam groove 63 as described above and a gear portion 82 is formed on the other end of the link 64. A horizontal coupling link 84 is coupled through an amplifying arc gear 83 engaged with this gear 82. The amplifying arc gear 83 and the horizontal coupling link 84 together with holder springs 86 and 87 and an energizing spring 88 are placed rotatably with the post 85 projecting upward from the main base 32 and passing therethrough. The holder spring 86 is engaged with the amplifying arc gear 83 and the horizontal coupling link 84 so that the amplifying arc gear 83 and the horizontal coupling link 84 rotate anticlockwise in FIG. 2. The holder spring 87 is engaged with the amplifying arc gear 83 and the horizontal coupling link 84 so that the amplifying arc gear 83 and the horizontal coupling link 84 rotate clockwise in FIG. 2. The holder spring 86 and the holder spring 87 are both energized by the energizing spring 88 so that the amplifying arc gear 83 and the horizontal coupling link 84 are energized in the above-described rotating directions. In consequence, the amplifying arc gear 83 and the horizontal coupling link 84 are always maintained in a balanced state by the holder springs 86 and 87.

The amplifying arc gear 83 amplifies the movement of the horizontal oscillation link 64 and transmits it to the horizontal coupling link 84. The horizontal coupling link 84 is an elongate bent member, one end thereof being supported rotatably by the post 85 as described above and the other end thereof having a small oval hole 91. A projection 93 of a sliding member 92 is engaged with this small hole 91 to form a sliding and turning pair. The sliding member 92 is slidable along a long groove 95 of an arm 94 to determine the direction in which the tape cassette 96 is to be inserted. The arm 94 is supported by a base 97 and a holder 98 so that the back end thereof (the leading edge in the direction in which the tape cassette is inserted) is positioned at the center of rotation. The front end of the arm 94 (the trailing edge in the direction in which the cassette tape is inserted) is engaged to lift the cassette holder 101. In addition, a projection (not shown) in the upper left end portion in FIG. 2 is engaged with a vertical coupling link 103 as shown in FIG. 4.

Figure 4:
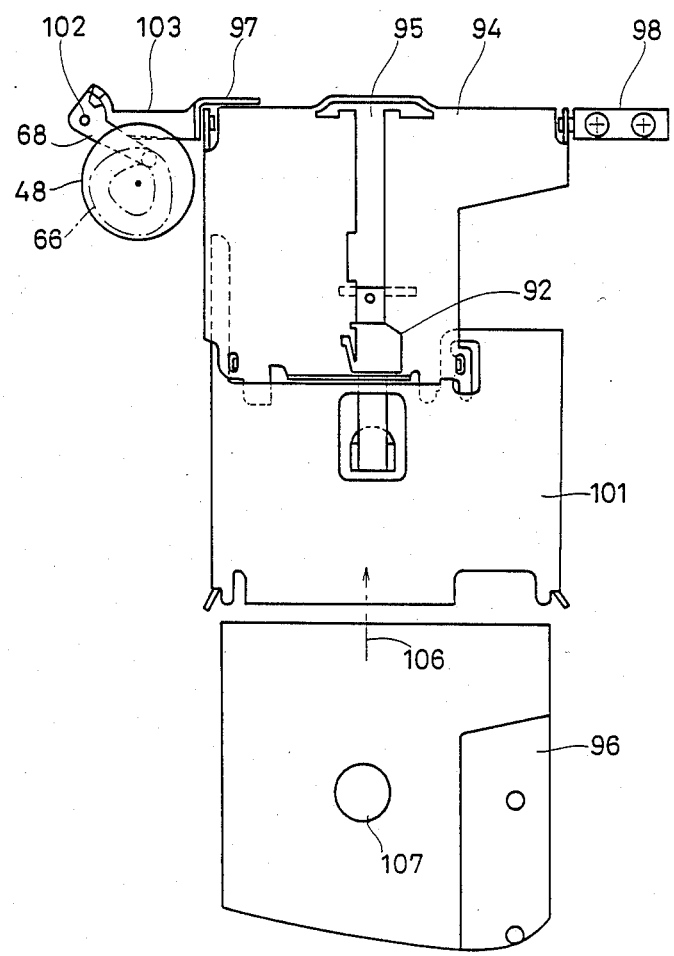
FIG. 4 is a plan view for explaining a mechanism for vertically moving a cassette tape in an embodiment of the present invention.
Figure 5:
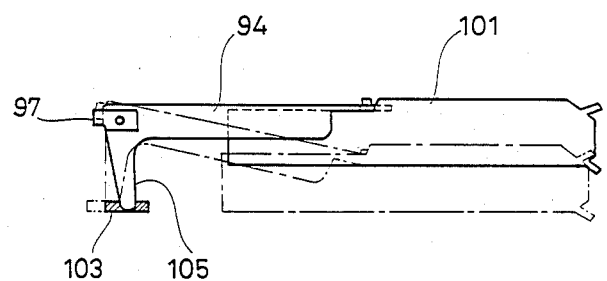
FIG. 5 is a side view for explaining a mechanism for vertically moving a cassette tape in an embodiment of the present invention.
Figure 6:
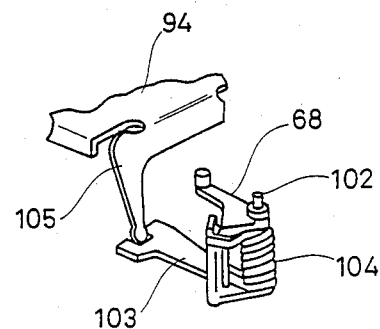
FIG. 6 is a partial enlarged perspective view of a coupling portion of an oscillation link in an embodiment of the present invention.

FIGS. 4 through 6 are views for explaining a mechanism for vertical movement of a tape cassette. Particularly, FIG. 4 is a plan view; FIG. 5 is a side view; and FIG. 6 is an enlarged perspective view of a coupling portion of an oscillation link, respectively.

Referring to FIGS. 4 through 6, the cam groove 66 is formed on the lower surface of the vertical movement cam 48 as described above, and one end of the vertical oscillation link 68 is engaged with this cam groove 66. The vertical oscillation link 68 together with the vertical coupling link 103 and the energizing spring 104 is supported rotatably by a post 102 projecting upward from a bottom base. The vertical oscillation link 68 and the vertical coupling link 103 are coupled through the energizing spring 104 so that the vertical oscillation link 68 and the vertical coupling link 103 are elastically coupled in a prescribed positional relationship. The top end of the vertical coupling link 103 is engaged with the projection 105 of the arm 94.

Now referring to FIGS. 2 through 6, the operation of tape cassette 96 loading and unloading mechanism will be described.

Before the tape cassette 96 is inserted, the tape loading and unloading mechanism is in a state as shown in FIG. 2. When the tape cassette 96 is inserted in the direction shown by the arrow 106, the leading portion 108 of the sliding member 92 is fitted in the reel hole 107 in the direction in which the tape cassette 96 is inserted. Then, the horizontal and backward movement cam 47 is rotated by the epicyclic gear train 35 described above with reference to FIG. 1. In consequence, the cam groove 63 having a predetermined loop shape formed on the surface of the cam 47 in a manner eccentric with respect to the rotating center of the cam 47, guides and moves the horizontal oscillation link 64 and the movement is amplified by the amplifying arc gear 83 and transmitted to the horizontal coupling link 84. The horizontal coupling link 84 rotates in the direction shown by the arrow 111 in FIG. 2 to slide the sliding member 92. As a result, the tape cassette 96 is taken into the cassette holder 101. After the tape cassette 96 is taken into the cassette holder 101, the vertical oscillation link 68 is rotated according to the rotation of the vertical movement cam 48 and the rotation of the link 68 is transmitted to the vertical coupling link 103. Accordingly, the vertical coupling link 103 enables the arm 94 to rotate around the base 97 (and the holder 98 not shown) as the center as shown by the chained lines in FIG. 5. In consequence, the cassette holder 101 is depressed from the state aligned on the same horizontal plane as the arm 94 to be brought into the state as shown by the chained lines in FIG. 5. This state corresponds to the state in which the tape cassette 96 is loaded in the so-called play, mode.

Unloading operation of the tape cassette 96 is performed in the following manner. By the rotation of the vertical movement cam 48 and the horizontal and backward movement cam 47, the tape cassette loading and unloading mechanism operates in the reverse order so that the tape cassette 96 is unloaded. In this case, the horizontal and backward movement cam 47 and the vertical movement cam 48 are rotated by 180° in the prescribed direction to bring the tape cassette 96 into the loaded state, and they are further rotated by 180° in the same direction to bring the tape cassette 96 into the unloaded state. In other words, by one rotation of the cams 47 and 48, one cycle of operation for loading and unloading the tape cassette is completed.

Figure 7:
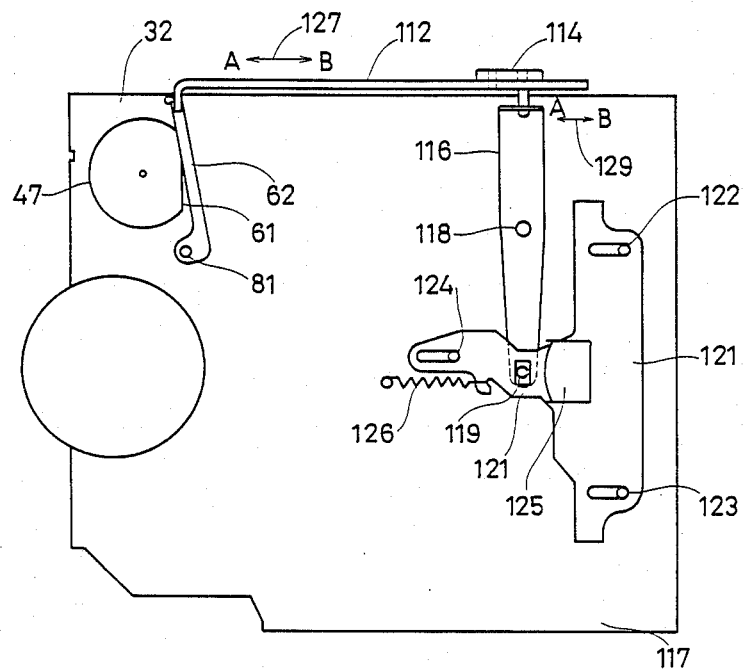
FIG. 7 is a plan view of a mechanism for moving a head base backward in an embodiment of the present invention.
Figure 8:
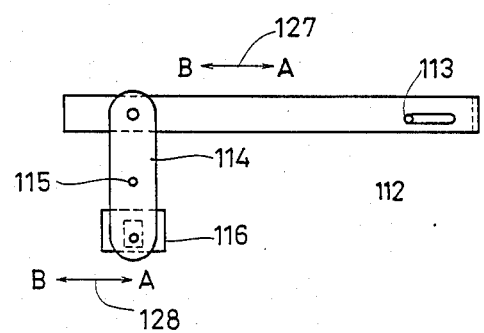
FIG. 8 is a partial side view of a mechanism for moving a head base backward in an embodiment of the present invention.

FIGS. 7 and 8 are views for explaining a mechanism for backward movement of head base. Particularly, FIG. 7 is a plan view of the mechanism and FIG. 8 is a partial side view of the mechanism.

Referring to FIGS. 7 and 8, the reference numeral 47 indicates the cam for horizontal movement of the cassette and backward movement of the head base. The plan view of the horizontal and backward movement cam 47 shown in FIG. 7 is different from the plan view of the cam 47 shown in FIG. 2. This is because FIG. 2 shows the top view of the cam 47 and FIG. 7 by contrast shows only the outer circumferential form of the lower half of the cam 47 for the purpose of explaining the operation of the mechanism for backward movement of head base. More specifically, the form of the cam 47 in FIG. 7 is the outer form of the portion in contact with the link 62 for backward movement of head base.

The link 62 for backward movement of the head base is an elongate member, one end of which is supported rotatably by the post 81. The other end of the link 62 is in contact with a link 112. The, central portion of the link 62 for backward movement of the head base is in contact with the outer surface of the cam 47 so that the rotation of the cam 47 causes the link 62 to oscillate around the post 81 as the center. The link 112 is an elongate member disposed along the horizontal direction. The portion of the link 112 on the side of the link 62 is supported slidably by a pin 113 projecting from the side wall of the main base 32. The other end of the link 112 is engaged with the upper end of a link 114 to form a point pair. The link 114 is provided on the side wall of the main base 32 by means of a pin 115 so that the link 114 rotates around the pin 115 as the center. The lower end of the link 114 is engaged with one end of a link 116 to form a turning pair. The link 116 is an elongate member disposed in parallel with the main base 32 in a manner in which the link 116 is rotatable around a pin 118 projecting from the main base 32. The other end of the link 116 has a projection 119 which is engaged with a head base 121. The head base 121 is nearly T-shaped and is supported by three guides 122, 123 and 124 in a manner slidable with respect to the main base 32. A magnetic head 125 is mounted on the central portion of the head base 121. In addition, the head base 121 is provided with a spring 126 so that the head base 121 is energized by the spring 126 toward the left direction in FIG. 7.

Next, the operation of the mechanism for backward movement of the head base will be described. The mechanism for backward movement of the head base moves the head 125 backward, namely, moves the head 125 toward the right direction in FIG. 7 at the time of loading and unloading the tape cassette so that the head 125 does not interfere with the tape cassette which is being loaded or unloaded. In the play mode of the tape cassette, this mechanism brings the head 125 to the position shown in FIG. 7 so that the head 125 is in contact with the surface of the tape cassette.

Now, let us consider the state in the play mode, in which the cam 47 for horizontal movement of the cassette and backward movement of the head base is as shown in FIG. 7, that is, the notch of the cam 47 is in contact with the link 62 for backward movement of the head base. In this state, the link 112 is moved relatively in the direction A shown by the arrow 127. Accordingly, the lower end of the link 114 is located on the B side of the arrow 128 and one end of the link 116 is directed toward the B side of the arrow 129. Thus, the head base 121 engaged with the other end of the link 116 is located on the left side in FIG. 7 so that the head 125 is in contact with the tape surface, not shown.

On the other hand, at the time of loading and unloading the tape cassette, the cam 47 for horizontal movement of the cassette and backward movement of the head base rotates so that the link 62 for backward movement of the head base is in contact with the circumferential surface of the cam 47. As a result, the backward movement link 62 is rotated by the circumferential surface of the cam 47 toward the right direction around the axis of post 81 acting as the center of rotation, compared with the state shown in FIG. 7. In consequence, the link 112 is caused to slide by the other end of the backward movement link 62 toward the direction B shown by the arrow 127. Accordingly, the lower end of the link 114 is moved toward the direction A shown by the arrow 128 and one end of the link 116 is moved toward the direction A shown by the arrow 129. Then, the head base 121 engaged with the other end of the link 116 is moved toward the right direction in FIG. 7 in opposition to the force of the spring 126. As a result, the head 125 is moved backward to the right side from the position in contact with the tape surface.

Figure 9:
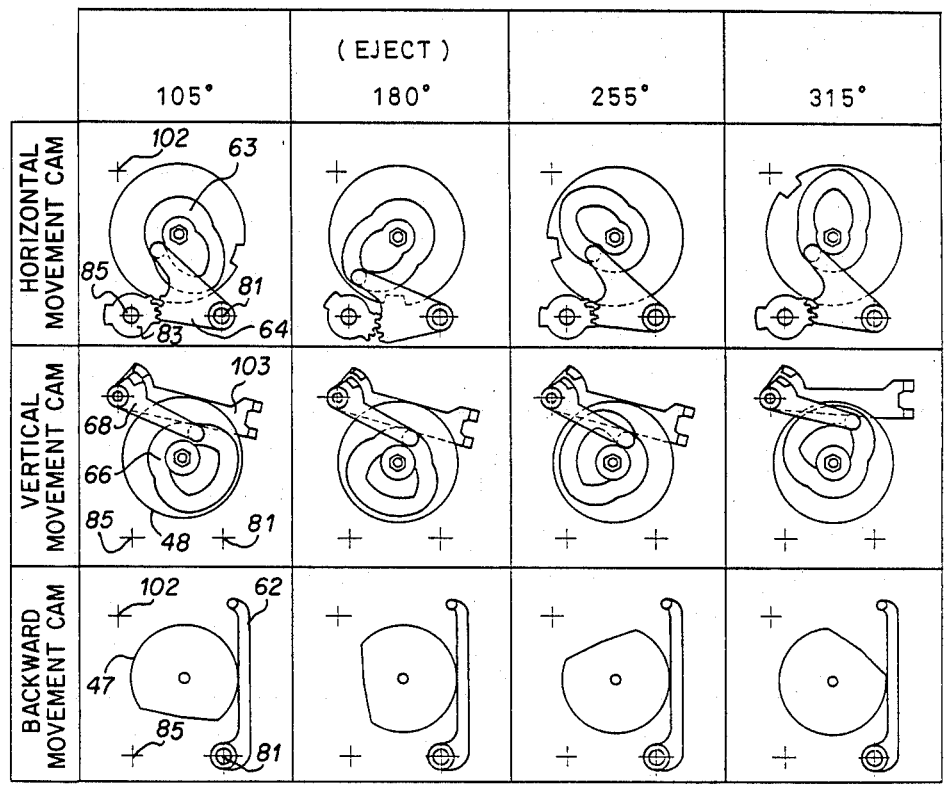
FIG. 9 is an illustration showing positional relations between the rotating angles of a cam 47 for moving a cassette horizontally and a head base backward and a cam 48 for moving a cassette vertically, and a link mechanism in accordance with an embodiment of the present invention.

FIG. 9 illustrates the above described positional relations between the rotating angles of the horizontal and backward movement cam 47 and the vertical movement cam 48 and the link mechanism driven by those cams. In FIG. 9, the horizontal and backward movement cam 47 which is practically formed as a unitary body is represented as being divided as a cam for horizontal movement of cassette and a cam for backward movement of the head base for convenience of explanation. As described previously, the cam for horizontal movement of the cassette, the cam for vertical movement of the cassette and the cam for backward movement of the head base are rotated as a unitary body on the same axis 45. Each time those cams are rotated once (by 360°), one cycle of operation for loading and unloading the tape cassette is completed. For this purpose, the cam for horizontal movement of the cassette and the cam for vertical movement of the cassette are provided with prescribed loop-shaped cam grooves 63 and 66 eccentric with respect to the rotating axes of the cams, the respective radii of those loop-shaped grooves being varied with respect to the rotating axes.

Figure 10:
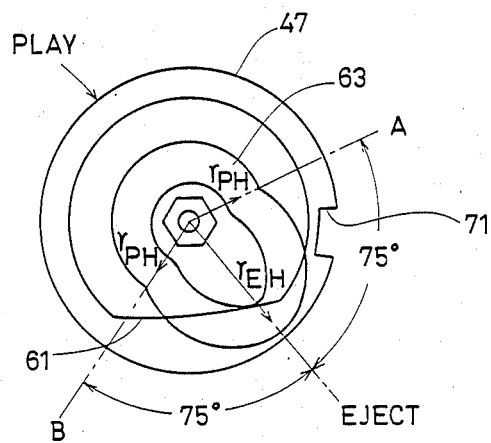
FIG. 10 is a diagram showing a figure of a cam groove 63 of the cam 47 for moving a cassette horizontally and a head base backward in an embodiment of the present invention.

FIG. 10 is a view showing the figure of the cam groove 63 formed on the cam 47 and a positional relationship thereof with the notch, 61. The cam groove 63 for horizontal movement of the cassette has a loop shape symmetrical with respect to the line connecting the EJECT position and the PLAY position. At the EJECT position, the radius of the cam groove 63 is made to have the largest value $r_{EH}$. In the area of 75° from the EJECT position to the point A attained by the clockwise rotation of the cam 47, the radius of the cam groove 63 decreases gradually and at the point A, the radius of the cam groove 63 is $r_{PH}$. Then, in the area of 120° from the point A to the point B including the PLAY position, the radius of the cam groove 63 is maintained at the constant value $r_{PH}$. Further, in the area of 75° from the point B to the EJECT position, the radius of the cam groove 63 is gradually increased. Thus, the horizontal cam groove 63 of the cam 47 for horizontal movement of the cassette and backward movement of the head base has a loop shape eccentric with respect to the center of the cam so that the cam groove is most distant from the central axis of the cam at the EJECT position and nearest to the central axis of the cam at the PLAY position and in the given area including this PLAY position. As a result, the figure of the eccentric loop-shaped groove 63 changes according to the rotation of the cam 47 so as to guide the engaged portion of the link. The notch 71 is to be engaged with the lock pin 55 as described previously with reference to FIG. 1.

Figure 11:
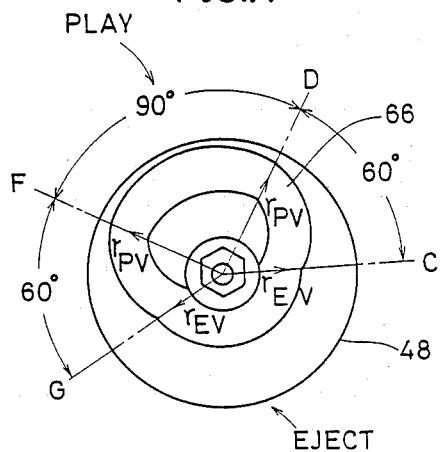
FIG. 11 is a diagram showing a figure of a cam groove 66 of the cam 48 for moving a cassette vertically in an embodiment of the present invention.

FIG. 11 is a view showing the figure of the vertical cam groove 66 formed on the cam 48 for vertical movement of cassette. The vertical cam groove 66 also has a loop shape symmetrical with respect to the line connecting the EJECT position and the PLAY position. In the area of 150° including the EJECT position as the center, the cam groove 66 is provided to have a radius $r_{EV}$ from the center line of the groove width to the central axis of the cam. In the area of 60° from the point C to the point D attained by the clockwise rotation of the cam 48 from the EJECT position, the radius of the loop-shaped cam groove 66 increases gradually from $r_{EV}$ to $r_{PV}$. Then, in the area of 90° from the point D to the point F including the PLAY position, the radius of the loop-shaped cam groove 66 is $r_{PV}$ and in the area of 60° from the point F to the point G, the radius decreases gradually from $r_{PV}$ to $r_{EV}$. Thus, according to the rotation of the cam 48, the radius of the loop-shaped cam groove 66 with respect to the central axis of the cam 48 changes so that the engaged portion of the link is guided and the link effects predetermined operation.

Figure 12:
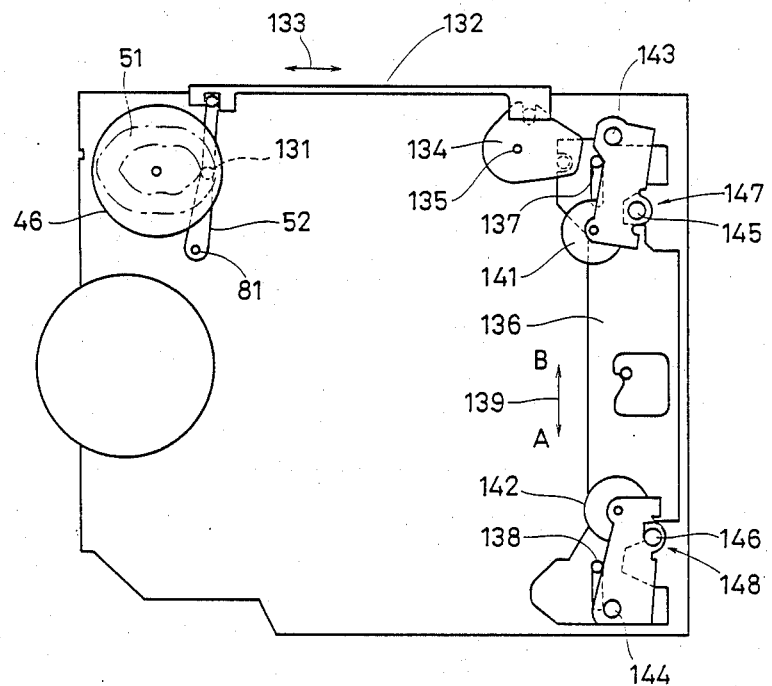
FIG. 12 is a plan view showing a pinch roller selecting mechanism in an embodiment of the present invention.

FIG. 12 is a plan view for explaining a pinch roller selecting mechanism. Since the cassette tape recorder in this embodiment has an automatically reversing function, two pinch rollers are selected alternately according to the rotating direction of the tape. Referring to FIG. 12, a cam groove 51 is formed on an operation mode selection cam 46. One end of n elongate oscillation link 52 is supported rotatably by the post 81. A projection 131 is provided on a central portion in the longitudinal direction of the oscillation link 52 and this projection 131 and the cam groove 51 form a sliding pair. The other end of the oscillation link 52 is engaged with a link 132. The link 132 slides in the directions shown by the arrow 133 according to the operation of the oscillation link 52. The other end of the link 132 is engaged with a link 134. The link 134 rotates with the pin 135 as a center of rotation provided on the main base 32, so that the movement of the link 132 is transmitted to a cam 136. The cam 136 is an elongate plate member disposed in parallel with the main base 32 which is supported by guides 137 and 138 fixed to the main base 32 so that it slides by those guides 137 and 138. The cam 136 slides in the directions shown by the arrow 139. The pinch rollers 141 and 142 are provided in association with the respective ends of the cam 136. More specifically, the pinch rollers 141 and 142 are provided on the main base 32 so as to be rotatable around the posts 143 and 144 respectively, and stoppers 145 and 146 are engaged with notches 147 and 148, respectively, of the cam 136 in a prescribed state. The notches 147 and 148 have forms such that the pinch roller 141 is operated when the cam 136 moves in the direction A of the arrow 139 in FIG. 12 and the pinch roller 142 is operated when the cam 136 moves to the contrary in the direction B of the arrow 139. Such sliding movement of the cam 136 is transmitted through the oscillation link 52 oscillated by the rotation of the operation mode selection cam 46, the link 132 and the link 134.

Figure 13:
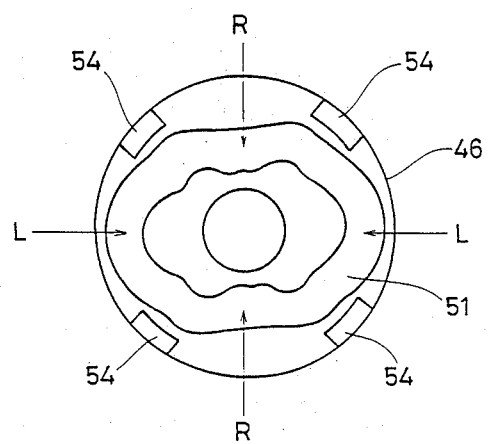
FIG. 13 is a view showing a figure of a cam groove 51 of an operation mode selecting cam 46 in an embodiment of the present invention.
Figure 14:
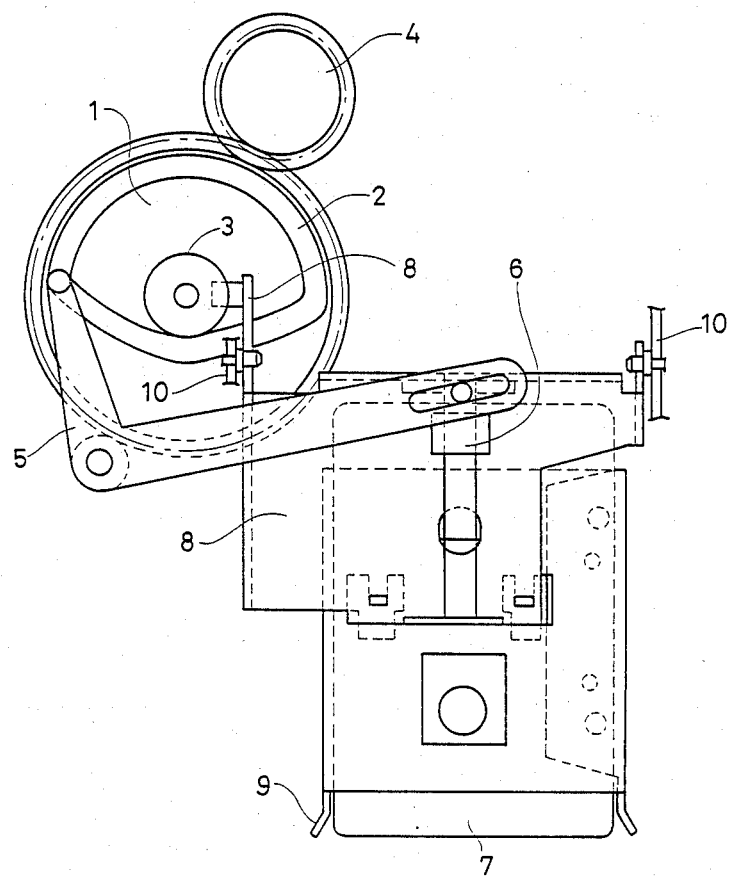
FIG. 14 is a view showing an example of a conventional cassette loading and unloading mechanism in a cassette tape recorder.
Figure 15:
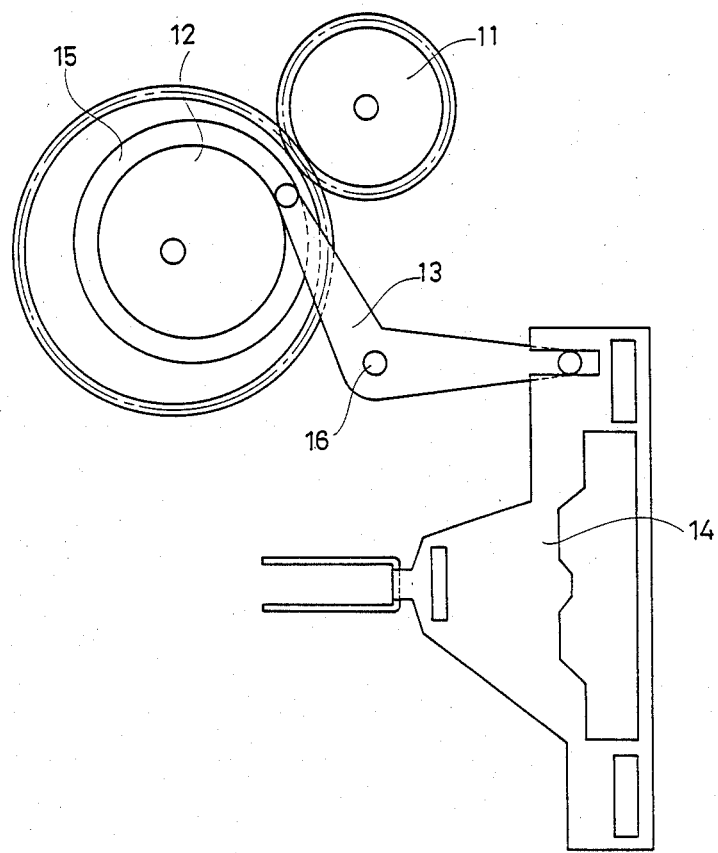
FIG. 15 is a view showing an example of a conventional operation mode selecting mechanism in a cassette tape recorder.

FIG. 13 is a view for explaining the figure of the cam groove 51 formed on the operation mode selection cam 46. The cam groove 51 has a loop shape symmetrical with respect to the vertical axis and the horizontal axis. At the point L in FIG. 13, the groove 51 is most distant from the central axis of the cam 46 and at the point R, it is nearest to the central axis of the cam 46. When the projection 131 of the oscillation link 52 is located at the point L, the left pinch roller 141 is brought into operation; when the projection 131 is located at the point R, the right pinch roller 142 is brought into operation. Thus, in this embodiment, each time the operation mode selection cam 46 makes one rotation, the pinch rollers 141 and 142 are selected twice. The four notches 54 formed symmetrically in the operation mode selection cam 46 are stopper cavities described above with reference to FIG. 1 and these cavities 54 are engaged with the lock pin 55 as described above.

As shown in FIG. 1, the operation mode selection cam 46 is driven at a reduction radio different from that of the horizontal and backward movement cam 47 or the vertical movement cam 48. Thus, the operation mode selection cam 46 is driven by an output gear different from that for the cam 47 or 48. In consequence, the operation mode selection cam 46 can be operated when the horizontal and backward movement cam 47 is in a stop state, and to the contrary, if the operation mode selection cam 47 is operated, the operation of the cam 47 can be stopped. The lock pin 55 projecting from the lock plate 56 serves for this purpose. Accordingly, dependent on the operation state of the cassette tape recorder, the lock plate 56 (see FIG. 1) slides vertically so that the horizontal and backward movement cam 47 or the operation mode selection cam 46 is selectively locked into an inoperable state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for loading and unloading tape cassette and for selecting an operation mode when the cassette is loaded, comprising:
    a shaft having an axis;
    a motor, providing rotational motion at a motor gear;
    speed reducing means disposed rotatably and coaxially with said shaft for receiving rotational input from said motor and providing an output at a reduced speed;
    a first cam element disposed rotatably and coaxially with said shaft, said first cam element being rotated by said speed reducing means;
    a second cam element disposed rotatably and coaxially with said shaft, said second cam element being rotated by said speed reducing means;
    a first link mechanism for loading and unloading said cassette, operation of said first link mechanism being controlled by motion of said first cam element;
    an operation mode selecting mechanism, operation thereof being controlled by motion of said second cam element; and
    a lock mechanism for stopping selectively the rotation of said first cam element or said second cam element wherein said first link mechanism comprises a horizontal movement mechanism for loading and unloading said cassette in a horizontal direction and a vertical movement mechanism for bringing said loaded cassette into an enabled state for running and for taking said cassette out of said enabled state and said first cam element is provided with a first closed loop-shaped path for horizontal operation including a non-circular portion and a portion shaped as a circular arc with a radius $r_{PH}$ about said axis for guiding the operation of said horizontal movement mechanism and a second closed loop-shaped path for vertical operation having a non-circular portion and first and second portions shaped as circular arcs with corresponding radii, $r_{PV}$ and $r_{EV}$ respectively, about said axis for guiding the operation of said vertical movement mechanism, whereby when either one of said vertical and horizontal movement mechanisms is in operation by engagement with said non-circular portion of its corresponding closed loop, the other of said vertical and horizontal movement mechanisms is engaged with a circular arc portion of its corresponding closed loop path at a corresponding radius so as to be not effecting cassette movement at that time.

2. An apparatus in accordance with claim 1, wherein: said first cam element comprises a horizontal cam portion in which said loop-shaped path for horizontal operation is formed, and a vertical cam portion in which said loop-shaped path for vertical operation is formed.

* * * * *